(12) United States Patent
Scipio et al.

(10) Patent No.: US 10,563,581 B2
(45) Date of Patent: Feb. 18, 2020

(54) SYSTEM AND METHOD OF COMPRESSOR INLET TEMPERATURE CONTROL WITH EDUCTOR

(71) Applicant: General Electric Company, Schenectady, NY (US)

(72) Inventors: Alston Ilford Scipio, Mableton, GA (US); Jason Brian Shaffer, Tempe, AZ (US); Joseph Philip Klosinski, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 15/167,295

(22) Filed: May 27, 2016

(65) Prior Publication Data

US 2017/0342901 A1  Nov. 30, 2017

(51) Int. Cl.
*F02C 7/08* (2006.01)
*F02C 9/18* (2006.01)
*F02C 7/057* (2006.01)

(52) U.S. Cl.
CPC .............. *F02C 7/08* (2013.01); *F02C 7/057* (2013.01); *F02C 9/18* (2013.01)

(58) Field of Classification Search
CPC .... F02C 7/08; F02C 7/047; F02C 3/32; F02C 3/34; F02C 9/18; F05D 2260/601
See application file for complete search history.

(56) References Cited

U.S. PATENT DOCUMENTS

| | | | |
|---|---|---|---|
| 4,271,664 A * | 6/1981 | Earnest | F01K 23/10 60/39.181 |
| 5,560,195 A * | 10/1996 | Anderson | F02C 7/04 417/80 |
| 6,442,941 B1 | 9/2002 | Anand et al. | |
| 6,543,234 B2 | 4/2003 | Anand et al. | |
| 8,844,258 B2 | 9/2014 | Ekanayake et al. | |
| 2002/0129608 A1 | 9/2002 | Anand et al. | |
| 2011/0154804 A1 | 6/2011 | Sutterfield | |
| 2013/0125554 A1* | 5/2013 | Mittricker | F01K 23/10 60/772 |
| 2013/0199196 A1 | 8/2013 | Chillar et al. | |
| 2013/0219916 A1* | 8/2013 | Desai | F02C 7/047 60/782 |
| 2014/0144124 A1* | 5/2014 | Mazumder | F02C 7/047 60/39.093 |
| 2014/0305127 A1* | 10/2014 | Schroder | F02C 6/16 60/772 |
| 2016/0123190 A1 | 5/2016 | Klosinski et al. | |

\* cited by examiner

*Primary Examiner* — Andrew H Nguyen
(74) *Attorney, Agent, or Firm* — Fletcher Yoder, P.C.

(57) ABSTRACT

A system includes a controller configured to control a heated flow discharged from an outlet of an eductor to an inlet control system to control a temperature of an intake flow through a compressor inlet of a compressor of a gas turbine system. The controller is configured to control a turbine extraction gas (TEG) flow to a motive inlet of the eductor. The controller is configured to control a suction flow to a suction inlet of the eductor. The TEG flow is extracted through a turbine casing, and the heated flow includes the TEG flow and the suction flow.

11 Claims, 8 Drawing Sheets

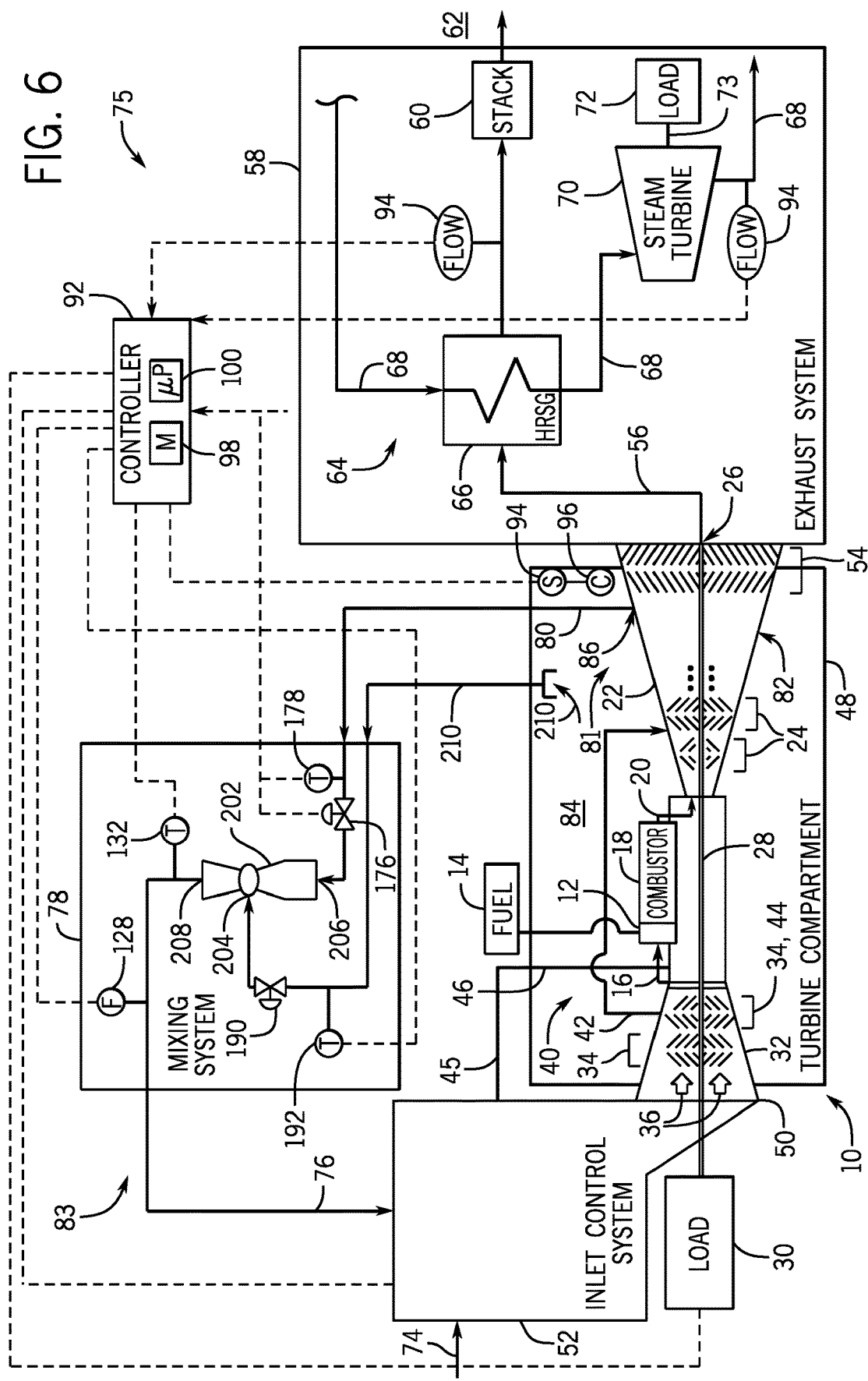

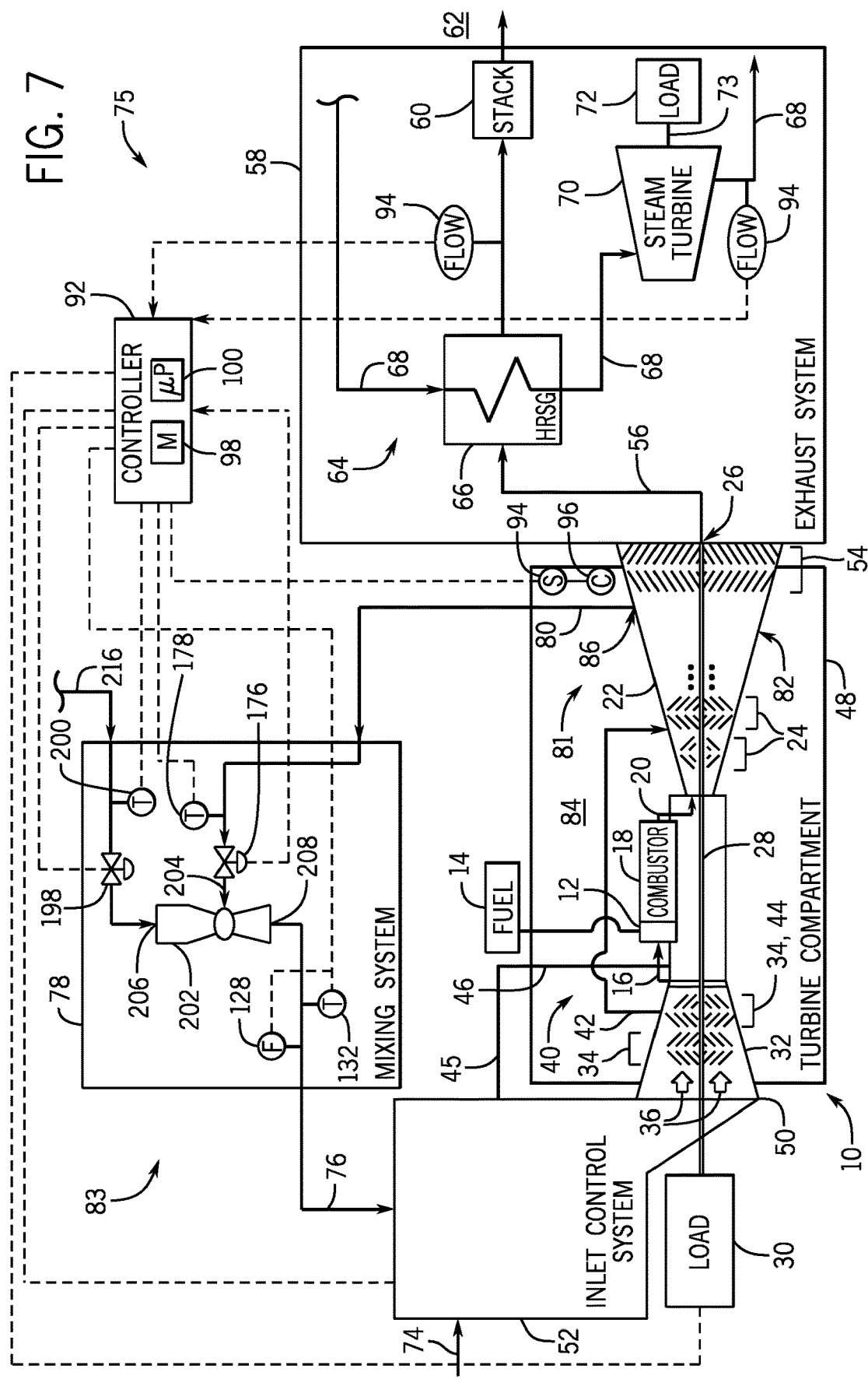

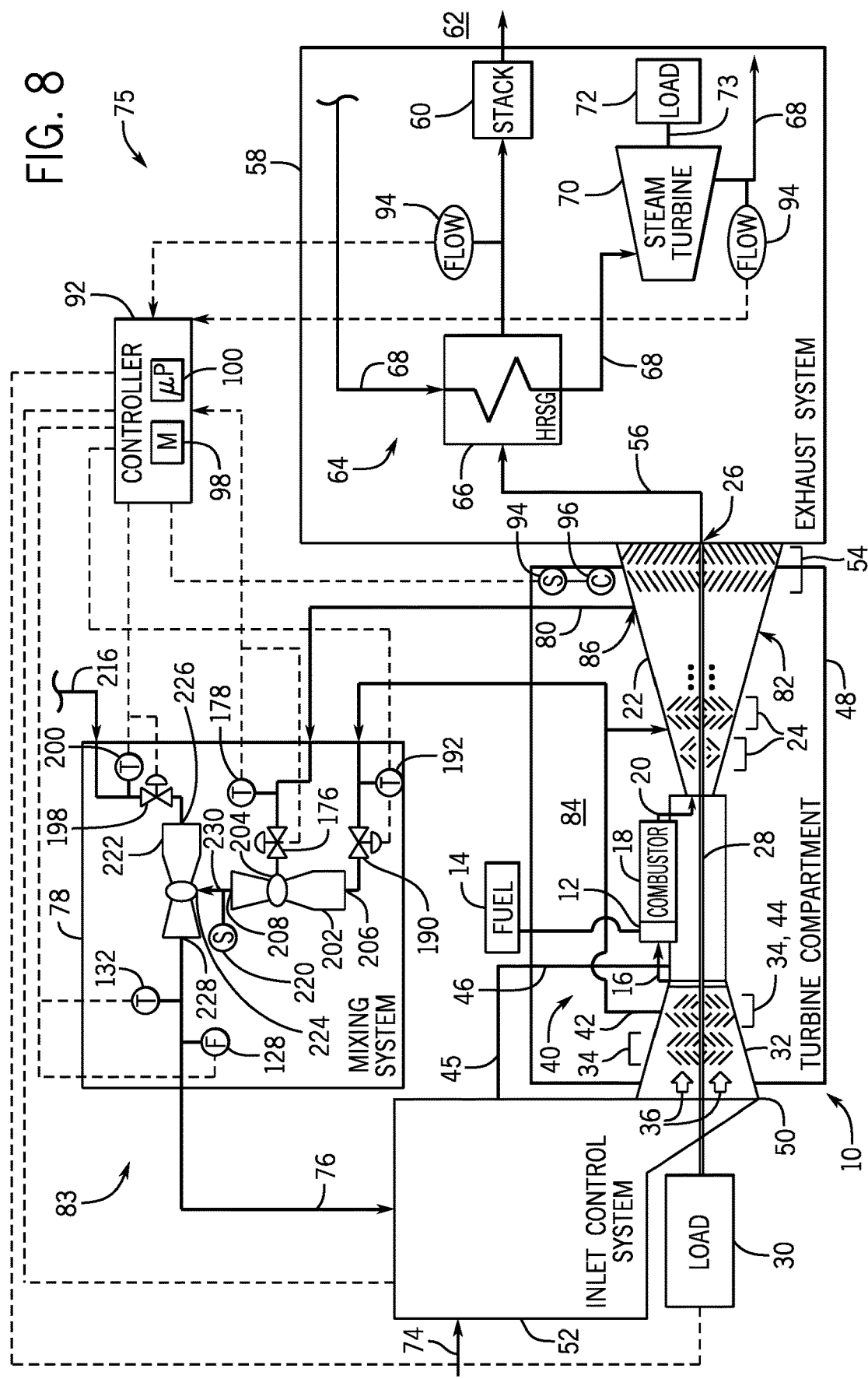

SYSTEM AND METHOD OF COMPRESSOR INLET TEMPERATURE CONTROL WITH EDUCTOR

BACKGROUND OF THE INVENTION

The subject matter disclosed herein relates to gas turbine engines, such as a system and method for controlling the inlet flow to a compressor of a gas turbine engine.

Gas turbine systems generally include a compressor, a combustor, and a turbine. The combustor combusts a mixture of compressed air and fuel to produce hot combustion gases directed to the turbine to produce work, such as to drive an electrical generator or other load. The compressor compresses air from an air intake, and subsequently directs the compressed air to the combustor. The load on the turbine may change during operation. However, the load on the turbine may change at a different rate than the work produced by the turbine. Additionally, the thermal efficiency of a typical gas turbine system may decrease as the load decreases.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine extraction gas (TEG) heating system that includes a turbine gas extraction system and a first eductor. The turbine gas extraction system is coupled to a turbine casing of a gas turbine system and to an inlet control system. The inlet control system is configured to control a temperature of an intake flow through a compressor inlet of a compressor of the gas turbine system. The first eductor includes a first motive inlet, a first suction inlet, and an outlet. The first motive inlet is configured to receive an extraction portion of combustion products as a turbine extraction gas (TEG) wherein the TEG is received through the turbine casing. The first suction inlet is configured to receive a suction flow with a suction pressure less than an extraction pressure of the TEG. The outlet is configured to discharge a heated flow to the inlet control system. The heated flow includes the TEG and the suction flow. The inlet control system is configured to supply the heated flow to the compressor inlet.

In a second embodiment, a system includes a controller configured to control a heated flow discharged from an outlet of an eductor to an inlet control system to control a temperature of an intake flow through a compressor inlet of a compressor of a gas turbine system. The controller is configured to control a turbine extraction gas (TEG) flow to a motive inlet of the eductor. The controller is configured to control a suction flow to a suction inlet of the eductor. The TEG flow is extracted through a turbine casing, and the heated flow includes the TEG flow and the suction flow.

In a third embodiment, a method includes extracting a portion of combustion products through a turbine casing of a turbine as a turbine extraction gas (TEG), mixing the TEG with a first suction flow within a first eductor to form a heated flow, supplying the heated flow to an inlet control system coupled to a compressor inlet of the compressor, and controlling the heated flow to the compressor inlet to control a temperature of an intake flow through the compressor inlet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a schematic diagram of an embodiment of the gas turbine system and the mixing system of FIG. 1 in which the eductor mixes turbine extraction gas and turbine compartment air;

FIG. 7 is a schematic diagram of an embodiment of the gas turbine system and the mixing system of FIG. 1 in which the eductor mixes turbine extraction gas and an external fluid flow; and FIG. 8 is a schematic diagram of an embodiment of the gas turbine system and the mixing system of FIG. 1 having two eductors.

DETAILED DESCRIPTION OF THE INVENTION

Figure 1:
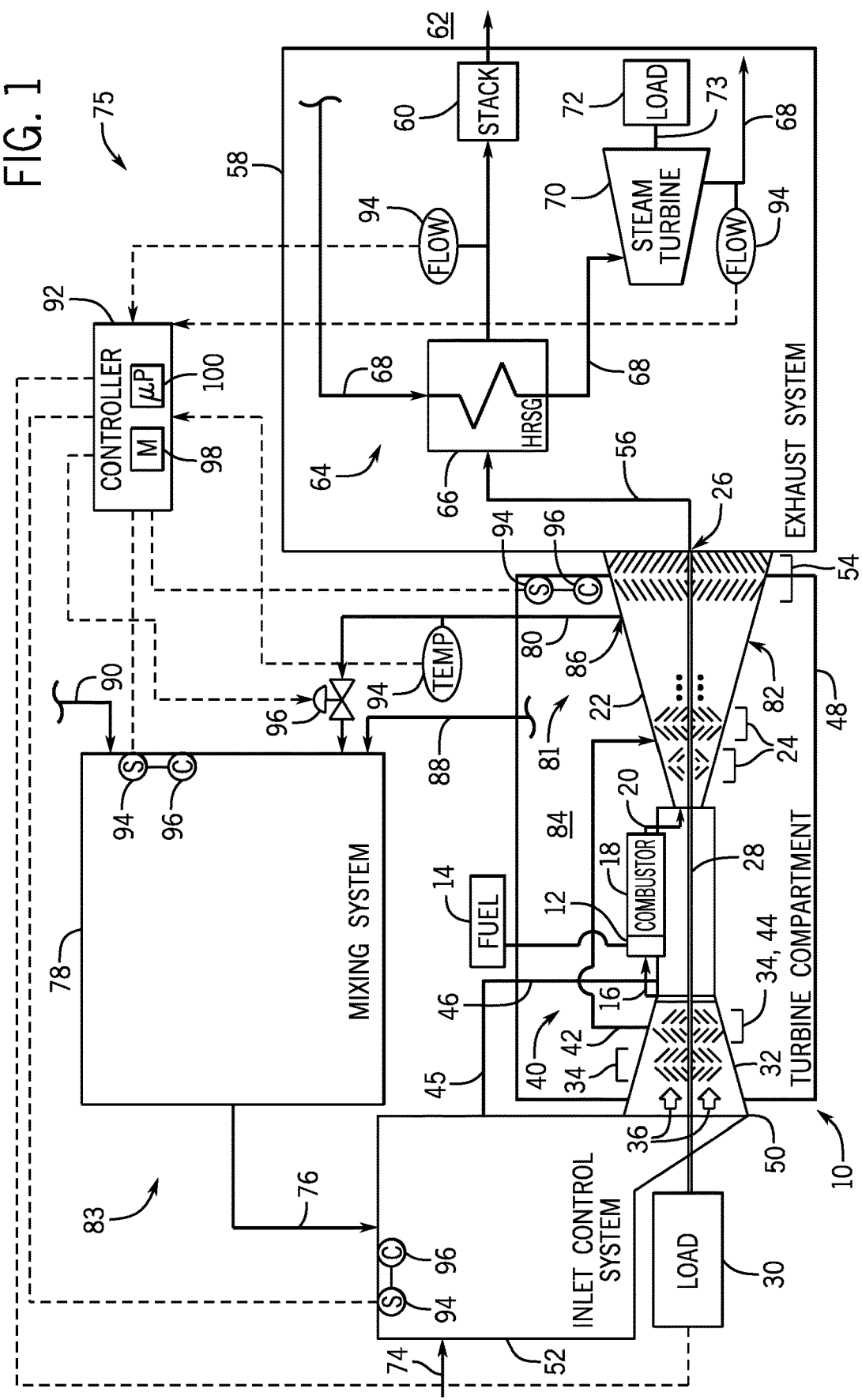
FIG. 1 is a block diagram of an embodiment of a gas turbine system with an inlet control system and a mixing system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, values discussed below with the term "approximately" are intended to be inclusive of values within 10 percent of the stated values.

Gas turbine systems expand combustion gases through turbines to produce work that may drive one or more loads.

Some gas turbine systems may be used in combined cycle and/or cogeneration systems that produce work from the heat of the combustion gases, such as through generating steam and directing the steam to a steam turbine. A gas turbine system may be selected to drive a design load of a known size, however, the actual load on the gas turbine system may change during operation of the gas turbine system. For example, the actual load may change rapidly when equipment (e.g., compressors, motors, pumps, and so forth) powered by a generator is turned on or off. When the actual load on the gas turbine system decreases, the gas turbine system may be turned down to reduce the work output to approximate the actual load. In a similar manner, when the actual load on the gas turbine system increases, the gas turbine system may be turned up to increase the work output to approximate the actual load.

The work produced by the gas turbine system is based at least in part on the quantity of an inlet flow (e.g., oxidant, air) supplied by the compressor to the combustor and to the turbine of the gas turbine system. Increasing the quantity of the inlet flow supplied to the combustor and to the turbine may increase the work produced, and decreasing the quantity of the inlet flow may decrease the work produced. As may be appreciated, increasing the temperature of a gas flow may decrease the density of the gas flow, and decreasing the temperature of the gas flow may increase the density of the gas flow. Accordingly, the quantity of the inlet flow supplied by the compressor may be controlled through controlling the temperature of the inlet flow without controlling the volumetric flow rate of the inlet flow.

The systems and methods described in detail below describe various embodiments that are configured to utilize turbine extraction gas (TEG) to control the temperature of the inlet flow supplied to the compressor inlet. As may be appreciated, the combustion products generated in the combustor of a gas turbine system are directed to the turbine for expansion through one or more stages of the turbine. Accordingly, the combustion products that enter the turbine are at a greater pressure and temperature than the exhaust gas that exits the turbine after the last stage of the turbine. As discussed herein, the turbine extraction gas (TEG) is a portion of the combustion products extracted from the turbine prior to expansion by the last stage of the turbine. That is, the TEG extracted from the turbine differs in at least the temperature and pressure (e.g., energy) from the exhaust gas that exits the turbine. In some embodiments, the TEG is extracted through the turbine casing. For example, the TEG may be extracted through an opening of the turbine casing, such as a borescope, inspection, or maintenance opening.

The extracted TEG may be used to directly or indirectly heat the inlet flow supplied to the compressor inlet. As discussed in detail below, the TEG may be added to an intake flow received from the ambient environment about the gas turbine system. Additionally, or in the alternative, the TEG may be supplied to the compressor inlet with one or more gas flows that may include, but is not limited to a bleed flow from the compressor, one or more steam flows, a second flow from the ambient environment, one or more gas flows from a compartment disposed around at least part of the gas turbine system, or any combination thereof. Furthermore, the TEG may be mixed with the one or more gas flows supplied to the compressor inlet, as discussed in detail below. Moreover, a controller may control the flow of the TEG and one or more other gases supplied to the compressor inlet, thereby enabling the controller to control the temperature of the inlet flow supplied to the compressor inlet.

Turning now to the drawings and referring first to FIG. 1, a block diagram of an embodiment of a gas turbine system 10 is illustrated. As described in detail below, the disclosed gas turbine system 10 (e.g., a gas turbine engine) may employ one or more fuel nozzles 12 to mix a fuel 14 with compressed flow 16. The gas turbine system 10 may use liquid or gas fuel 14, such as natural gas and/or a hydrogen rich synthetic gas, to drive the gas turbine system 10. As depicted, the one or more fuel nozzles 12 intake the fuel 14, mix the fuel 14 with the compressed flow 16, and distribute the air-fuel mixture into a combustor 18 in a suitable ratio for optimal combustion, emissions, fuel consumption, and power output. The air-fuel mixture combusts within the combustor 18, thereby creating a flow 20 of hot pressurized combustion products. The combustor 18 directs the combustion product flow 20 through a turbine 22 with one or more stages 24 toward an exhaust outlet 26. As the combustion product flow 20 passes through the turbine 22, the combustion product flow 20 forces turbine blades of each stage 24 to rotate a shaft 28 along an axis of the gas turbine system 10. As illustrated, the shaft 28 may be connected to various components of the gas turbine system 10, including a load 30 and the compressor 32. The load 30 may be a part of a vehicle or a stationary load, such as a propeller on an aircraft or an electrical generator in a power plant, for example. The load 30 may include any suitable device capable of being powered by the rotational output of the gas turbine system 10.

The shaft 28 may also be connected to the compressor 32. The compressor 32 also includes one or more stages 34 with blades coupled to the shaft 28. As the shaft 28 rotates, the blades within the compressor 32 also rotate, thereby compressing an inlet flow 36 from an inlet control system 52 through the compressor 32 and into the fuel nozzles 12 and/or combustor 18. As described in detail below, some of the compressed flow 16 may be directed through a bleed system 40 for various purposes. In some embodiments, the bleed system 40 may bleed (e.g., extract) a compressor extraction gas (CEG) flow 42 from the compressor 32 prior to the last stage 44 of the compressor 32 (e.g., from an intermediate stage) for use within the gas turbine system 10. Additionally, or in the alternative, the bleed system 40 may bleed (e.g., extract) a bleed flow 46 from an output of the compressor 32 after the last stage 44 of the compressor 32. As discussed herein, a pressurized flow 45 from the compressor 32 may be either a portion of the CEG flow 42 or portion the bleed flow 46. In some embodiments, the pressurized flow 45 may be directed through the bleed system 40 to heat the inlet flow 36, to release excess pressure produced by the compressor 32, to protect the combustor 18 and/or to protect the turbine 22 from surge or stall conditions, to cool the combustion product flow 20, to dilute the combustion product flow 20, to entrain the combustion product flow 20 through the turbine 22 toward the exhaust outlet 26, to cool the turbine 22, and so forth.

Entire components or portions of components of the gas turbine system 10 may be disposed within a turbine compartment 48. For example, the combustor 18, the fuel nozzles 12, one or more turbine stages 24 of the turbine 22, and one or more stages 34 of the compressor 32, and one or more portions of the shaft 28 may be disposed within the turbine compartment 48. A compressor inlet 50 that receives the inlet flow 36 from an inlet control system 52 may be disposed within or outside of the turbine compartment 48. The exhaust outlet 26 that directs an expanded combustion product flow (e.g., exhaust gas flow 56) after a last stage 54 of the turbine 22 may be disposed within or outside of the turbine compartment 48.

The exhaust outlet 26 may direct the exhaust gas flow 56 to an exhaust system 58. In some embodiments, the exhaust system 58 directs the exhaust gas flow 56 to a stack 60. The stack 60 may process (e.g., cool, filter, catalyze, expand) the exhaust gas flow 56 prior to release to an ambient environment 62 about the gas turbine system 10. In some embodiments, the exhaust system 58 includes a heat recovery system 64 that extracts energy from the heat of the exhaust gas flow 56. For example, the heat recovery system 64 may include a heat recovery steam generator (HRSG) 66 that heats a fluid flow 68 (e.g., water, steam, water/steam mixture) and directs the heated fluid flow 68 to a steam turbine 70. The steam turbine 70 may expand and cool the heated fluid flow 68 to drive a second load 72 coupled to the steam turbine 70 by a second shaft 73. In some embodiments, the second shaft 73 is coupled to or is the same as the shaft 28 coupled to the turbine 22. Furthermore, the second load 72 may be the same load 30 driven by the turbine 22, or a different load. The fluid flow 68 that exits the steam turbine 70 may be returned to the HRSG 66, directed to the gas turbine system 10 as discussed in detail below, or directed to another system. As may be appreciated, the exhaust system 58 and the gas turbine system 10 may be a part of a power generation system 75 that is a combined cycle system or a cogeneration system.

The inlet flow 36 received at the compressor inlet 50 of the compressor 32 may include one or more gas flows processed through the inlet control system 52. The inlet control system 52 may receive an intake flow 74 from the ambient environment 62, such that the intake flow 74 includes an oxidant (e.g., oxygen) for combustion with the fuel 14 in the combustor 18. In some embodiments, the inlet control system 52 may receive the pressurized flow 45 (e.g., CEG flow 42, bleed flow 46) from the bleed system 40 of the gas turbine system 10. Moreover, as described in detail below, the inlet control system 52 may receive a heated flow 76 from a mixing system 78.

The mixing system 78 receives a turbine extraction gas (TEG) flow 80 extracted from the turbine 22 by a turbine gas extraction system 81. It may be appreciated that the heated flow 76 provided to the inlet control system 52 includes at least the TEG flow 80. That is, for embodiments without the mixing system 78, the heated flow 76 includes at least the TEG flow 80. As discussed herein, a turbine extraction gas (TEG) heating system 83 utilizes the TEG flow 80 to heat the inlet flow 36 at the compressor inlet 50. The TEG heating system 83 may include, but is not limited to, the inlet control system 52, the mixing system 78, a controller 92, and the turbine gas extraction system 81. The TEG flow 80 is a portion of the combustion product flow 20 received by the turbine 22 that is extracted by the turbine gas extraction system 81 prior to the last stage 54 of the turbine 22. Accordingly, the TEG flow 80 has more energy than the exhaust flow 56 received by the exhaust system 58. That is, the TEG flow 80 has a greater pressure, a greater temperature, a greater velocity, or any combination thereof, relative to the exhaust flow 56. The TEG flow 80 may have a gauge pressure relative to the ambient environment 62 greater than approximately 0, 100, 175, 350, or 750 kPa or more (e.g., approximately 0, 14.5, 25.4, 50.8, or 101.5 psi or more). The temperature of the TEG flow 80 may be greater than approximately 200, 400, 600, 800, 1000, or 1200 degrees Celsius or more (e.g., approximately 392, 752, 1112, 1472, 1832, or more 2192 degrees Fahrenheit or more). Additionally, the TEG flow 80 may have a lesser percentage of oxidant per volume than the pressurized flow 45. In some embodiments, the TEG flow 80 may have an oxidant concentration (e.g., $O_2$) of less than 5, 4, 3, 2, or 1 percent by volume. The TEG flow 80 may be extracted from the turbine 22 prior to entering the stages 24 of the turbine 22, between stages of the turbine 22, or immediately upstream of the last stage 54 of the turbine 22. As may be appreciated, combustion product flow 20 and the stages 24 of the turbine are disposed within a turbine casing 82 that isolates the combustion product flow 20 from an environment 84 within the turbine compartment 48 and from the ambient environment 62. Accordingly, the TEG flow 80 is extracted through the turbine casing 82. For example, the TEG flow 80 may be extracted through an opening 86 of the turbine casing 82 that may otherwise be utilized for inspections or maintenance of the turbine 22. The opening 86 may include, but is not limited to, a borescope opening, a maintenance hatch, an inspection port, or any combination thereof.

The mixing system 78 may mix the TEG flow 80 with an internal flow 88 from the turbine compartment 48 or an external flow 90 from a source outside the turbine compartment 48. As discussed in detail below, the internal flow 88 may include, but is not limited to, the pressurized flow 45, a turbine compartment air flow drawn from the turbine compartment environment 84, or any combination thereof. The external flow 90 may include, but is not limited to a water flow (e.g., fluid flow 68), a steam flow (e.g., fluid flow 68), an air flow drawn from the ambient environment 62, or any combination thereof. The temperatures of the internal flow 88 or the external flow 90 mixed with the TEG flow 80 are less than the temperature of the TEG flow 80, such as less than approximately 500, 400, 300, 200, 100, or 50 degrees Celsius (e.g., approximately 932, 752, 572, 392, 212, or 122 degrees Fahrenheit).

The controller 92 of the gas turbine system 10 may be coupled to one or more of the components described above and illustrated in FIG. 1 to monitor the gas turbine system 10, to control the gas turbine system 10, or any combination thereof. The controller 92 may be coupled to one or more sensors 94 (e.g., temperature, pressure, flow rate, position, composition) throughout the gas turbine system 10. Moreover, the controller 92 may be coupled one or more controls 96 (e.g., motors, valves, actuators) throughout the gas turbine system 10. The controller 92 includes a memory 98 and a processor 100. The memory 98 may be a machine readable media configured to store code or instructions to be used by the processor 100 to process feedback received from the sensors 94. Additionally, or in the alternative, the memory 98 may store code or instructions to be used by the processor 100 to control the controls 96 or to control the components (e.g., load 30, turbine 22, compressor 32, fuel nozzles 12) of the gas turbine system 10 in response to feedback form the sensors 94. More specifically, the controller 92 controls and communicates with various components in the gas turbine system 10 in order to control the temperature and density of the inlet flow 36 received at the compressor inlet 50. As described in detail below, the controller 92 may control flows (e.g., TEG flow 80, internal flow(s) 88, external flow(s) 90) through the mixing system 78 to control at least one of the temperature, the composition, and the flow rate of the heated flow 76 supplied to the inlet control system 52. Furthermore, the controller 92 may control flows (e.g., heated flow 76, intake flow 74, pressurized flow 45 from the bleed system 40) through the inlet control system 52 to control at least one of the temperature, the composition, and the flow rate of the inlet flow 36 received at the compressor inlet 50. Additionally, the controller 92 may control the TEG flow 80 extracted from the turbine 22 based at least in part on changes to the load 30 on the turbine 22. That is, the controller 92 may utilize the TEG flow 80 to reduce the output (e.g., turndown) of the turbine 22 through heating the inlet flow 36, through reducing the combustion products 20 expanded by the turbine 22, or any combination thereof. Accordingly, the TEG flow 80 extracted from the turbine 22 may have a greater effect on the output of the turbine 22 than heating the inlet flow 36 alone.

Figure 2:
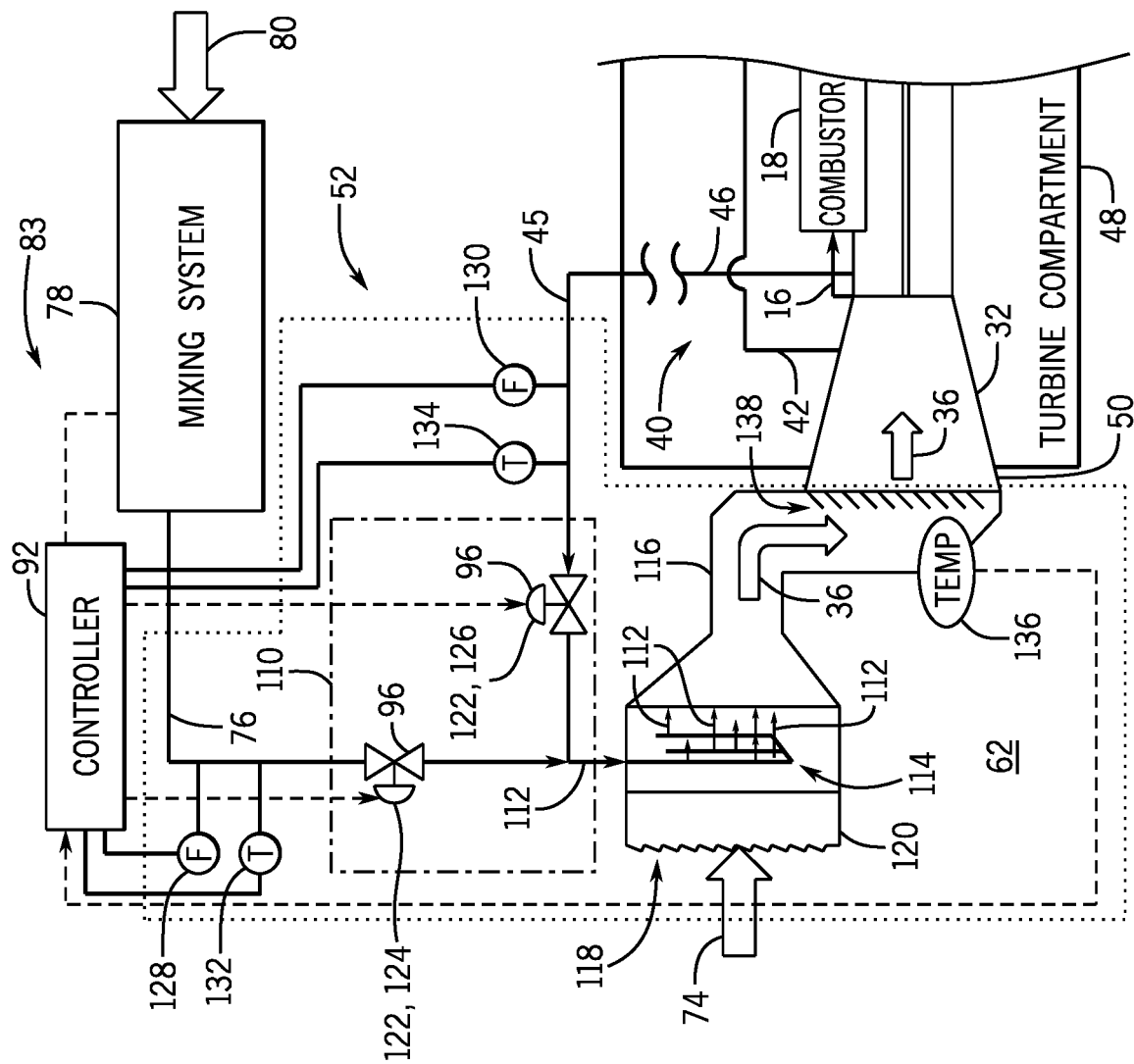
FIG. 2 is a schematic diagram of an embodiment of the inlet control system of FIG. 1 with an inlet bleed heat (IBH) valve system.

FIG. 2 is a schematic diagram of an embodiment of the inlet control system 52 of FIG. 1 with an inlet bleed heat (IBH) valve system 110. The IBH valve system 110 receives the heated flow 76 (e.g., at least the TEG flow 80) and the pressurized flow 45 from the bleed system 40, and directs a first controlled flow 112 to an IBH manifold 114 within an intake duct 116 of an intake system 118. The IBH manifold 114 distributes the first controlled flow 112 into the intake flow 74 upstream of the compressor inlet 50, such that the first controlled flow 76 may be mixed with the inlet flow 36 prior to receipt at the compressor inlet 50. The intake flow 74 may be received through a filter house 120 that processes (e.g., filters) the intake flow 74.

The controller 92 controls one or more valves 122 of the IBH valve system 110 to control the composition of the first controlled flow 112. For example, the IBH valve system 110 may include a heated flow valve 124 to control the flow rate of the heated flow 76 to the IBH manifold 114 from the mixing system 78. In some embodiments without a mixing system 78, the heated flow 76 is the TEG flow 80. The IBH valve system 110 may include a bleed flow valve 126 to control the flow rate of the pressurized flow 45 to the IBH manifold 114 from the bleed system 40. The TEG flow 80 may be warmer than the pressurized flow 45. Accordingly, a small quantity of the TEG flow 80 added alone to the intake flow 74 may have approximately the same effect on the temperature of the inlet flow 36 as a larger quantity of the pressurized flow 45 added alone. For example, where a first flow rate of the pressurized flow 45 that is approximately 5 percent of the output flow rate of the compressor 32 may be utilized to heat the intake flow 74 to a desired temperature, a second flow rate of the TEG flow 80 that is less than approximately 1.5, 2, or 3 percent of the output flow rate of the turbine 22 may be utilized to heat the intake flow 74 to the same desired temperature. That is, the TEG flow 80 may be approximately 1.5 to 3 times more effective at increasing the temperature of the intake flow than the pressurized flow 45 alone. The controller 92 may control the heated flow valve 124 and the bleed flow valve 126 to adjust a ratio of the TEG flow 80 to the pressurized flow 45 in the first controlled flow 112. In some embodiments, the controller 92 may control the heated flow 76 to be between approximately 0 to 100 percent, 0.1 to 75 percent, 0.1 to 50 percent, or 0.1 to 25 percent of the first controlled flow 112. In some embodiments, the controller 92 may control the heated flow 76 to be any non-zero portion of the first controlled flow 112, with the pressurized flow 45 making up any remainder of the first controlled flow 112.

The controller 92 may control at least one of the temperature and the flow rate of the first controlled flow 112 supplied to the IBH manifold 114 through control of the IBH valve system 110. In some embodiments, the controller 92 may receive flow rate feedback of the heated flow 76 from a first flow rate sensor 128, flow rate feedback of the pressurized flow 45 from a second flow rate sensor 130, temperature feedback of the heated flow 76 from a first temperature sensor 132, temperature feedback of the pressurized flow 45 from a second temperature sensor 134, or any combination thereof. The controller 92 may control the heated flow valve 124 and the bleed flow valve 126 based at least in part on a desired temperature of the first controlled flow 112, a desired flow rate of the first controlled flow 112, or any combination thereof. As may be appreciated, a relatively high temperature and low flow rate of the first controlled flow 112 may have a similar effect on the temperature of the inlet flow 36 received at the compressor inlet 50 as a lower temperature and higher flow rate of the first controlled flow 112. Moreover, the controller 92 may control the IBH valve system 110 to control the first controlled flow 112 based at least in part on a desired flow rate of the inlet flow 36, a desired temperature of the inlet flow 36, a desired composition (e.g., oxidant percentage per volume) of the inlet flow 36, or any combination thereof.

The controller 92 may be coupled to a third temperature sensor 136 configured to provide temperature feedback of the inlet flow 36 to be received at the compressor inlet 50. The third temperature sensor 136 may be coupled to the intake duct 116 or to the compressor inlet 50. Inlet guide vanes (IGVs) 138 of the compressor 32 control the quantity (e.g., volumetric flow rate) of the inlet flow 36 into the compressor 32. The controller 92 may be coupled to the IGVs 138 to control the flow rate of the inlet flow 36. In some embodiments, the controller 92 controls the IGVs 138 with the IBH valve system 110 to control the flow rate and the temperature of the inlet flow 36.

Figure 3:
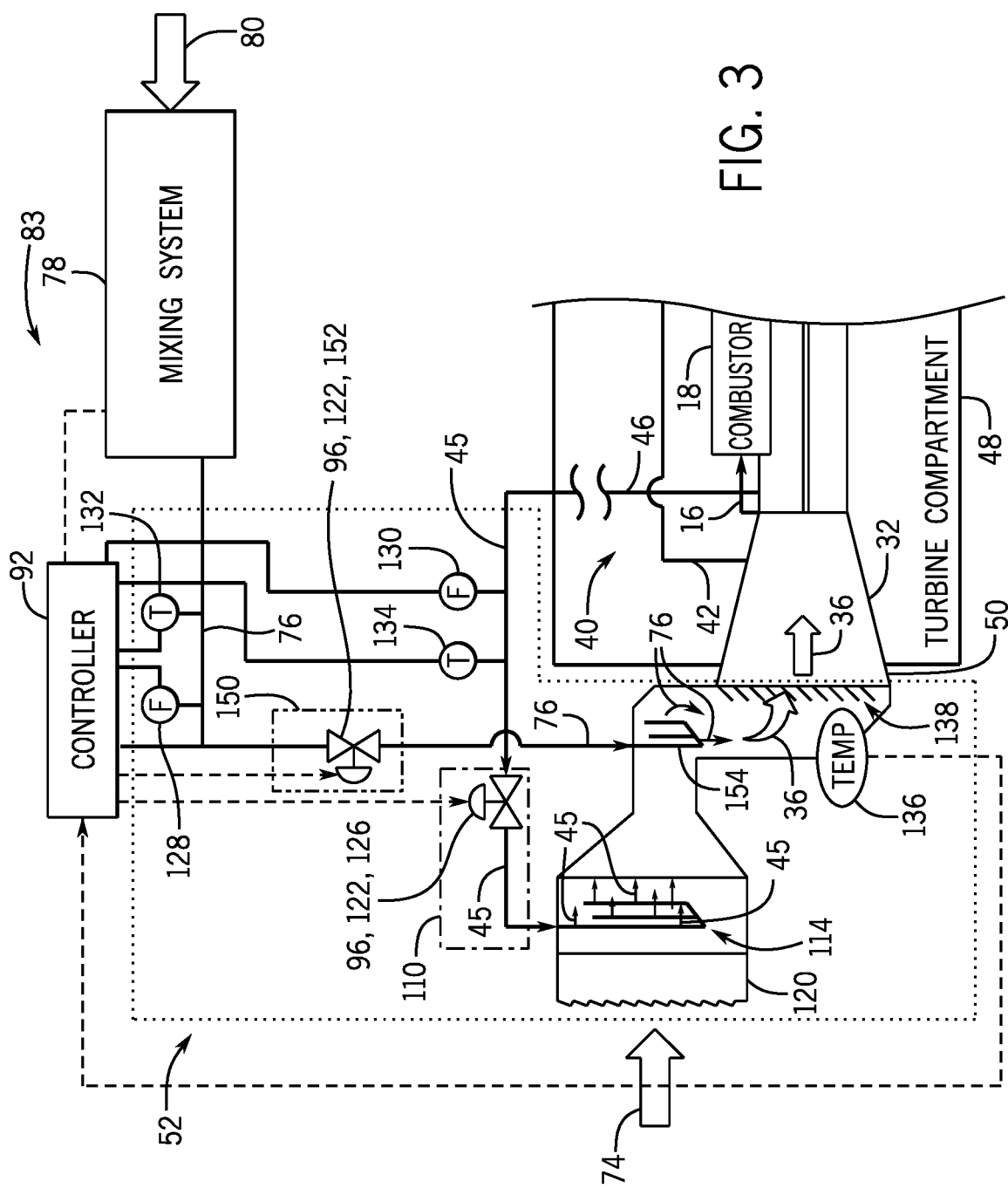
FIG. 3 is a schematic diagram of an embodiment of the inlet control system of FIG. 1 with an IBH valve system and a supplemental inlet heating (IH) valve system.

In some embodiments, the IBH valve system 110 may utilize a three-way valve in place of or in addition to the separate heated flow valve 124 and the bleed flow valve 126 illustrated in FIG. 2. In some embodiments, the IBH valve system 110 and the IBH manifold 114 are configured to facilitate control of the temperature of the inlet flow 36 without any of the TEG flow 80 through the IBH manifold 114. That is, the IBH valve system 110 may be configured to add only the pressurized flow 45 to the intake flow 74 in the intake duct 116. As illustrated in FIG. 3, another embodiment of the inlet control system 52 may include a supplemental inlet heating (IH) system 150 with a supplemental IH valve 152 configured to control the heated flow 76 to a supplemental IH manifold 154 disposed within the intake duct 116. The supplemental IH manifold 154 may add the heated flow 76, which includes at least a portion of the TEG flow 80, to the intake flow 74. The supplemental IH manifold 154 may be disposed upstream or downstream of the IBH manifold 114, which may add the pressurized flow 45 to the intake flow 74. The controller 92 may be coupled to the supplemental IH valve 152 to control the addition of the heated flow 76 to the intake flow 74, thereby facilitating temperature control of the inlet flow 36 received through the compressor inlet 50. In some embodiments, the controller 92 may control the temperature of the inlet flow 36 by adding only the heated flow 76 through the supplemental IH manifold 154 to the intake flow 74; however, in other embodiments, the controller 92 may control the temperature of the inlet flow 36 by adding the heated flow 76 through the supplemental IH manifold 154 and by adding the pressurized flow 45 through the IBH manifold 114 to the intake flow 74. That is, the controller 92 may utilize the supplemental IH valve system 150 alone or in combination with the IBH valve system 110 to control the temperature of the inlet flow 36.

In some embodiments, the supplemental IH valve system 150 and the supplemental IH manifold 154 may be configured to operate with a greater range of flow rates than the IBH valve system 110 and the IBH manifold 114. For example, the supplemental IH valve system 150 and the supplemental IH manifold 154 may enable a higher maximum flow rate, a lower minimum flow rate, or any combination thereof, relative to the IBH valve system 110 and the IBH manifold 114. Additionally, or in the alternative, the supplemental IH valve system 150 and the supplemental IH manifold 154 may be configured to operate with flows having a higher temperature range than flows (e.g., pressurized flow 45) through the IBH valve system 110 and the IBH manifold 114.

The controller 92 may control at least one of the temperature and the flow rate of the heated flow 76 supplied to the supplemental IH manifold 154 through control of the supplemental IH valve system 150. The controller 92 may receive flow rate feedback of the heated flow 76 from a first flow rate sensor 128, flow rate feedback of the pressurized flow 45 from a second flow rate sensor 130, temperature feedback of the heated flow 76 from a first temperature sensor 132, temperature feedback of the pressurized flow 45 from a second temperature sensor 134, or any combination thereof. The controller 92 may control the supplemental IH valve 152 based at least in part on a desired temperature of the heated flow 76, a desired flow rate of the heated flow 76, or any combination thereof. As may be appreciated, a relatively high temperature and low flow rate of the heated flow 76 may have a similar effect on the temperature of the inlet flow 36 received at the compressor inlet 50 as a lower temperature and higher flow rate of the pressurized flow 45 from the IBH manifold 114. Moreover, the controller 92 may control the supplemental IH valve system 150 to control the heated flow 76 based at least in part on a desired flow rate of the inlet flow 36, a desired temperature of the inlet flow 36, a desired composition (e.g., oxidant percentage per volume) of the inlet flow 36, or any combination thereof. Furthermore, in embodiments with both the supplemental IH valve system 150 and the IBH valve system 110, the controller 92 may control the bleed flow valve 126 in a similar manner as discussed above with FIG. 2 to control the temperature and flow rate of the pressurized flow 45 supplied to the intake flow 74 via the IBH manifold 114.

The controller 92 may be coupled to a third temperature sensor 136 configured to provide temperature feedback of the inlet flow 36 to be received at the compressor inlet 50. The third temperature sensor 136 may be coupled to the intake duct 116 or to the compressor inlet 50. The IGVs 138 of the compressor 32 control the quantity (e.g., volumetric flow rate) of the inlet flow 36 into the compressor 32. The controller 92 may be coupled to the IGVs 138 to control the flow rate of the inlet flow 36. In some embodiments, the controller 92 controls the IGVs 138 with the IBH valve system 110 and the supplemental IH valve system 150 to control the flow rate and the temperature of the inlet flow 36.

Figure 4:
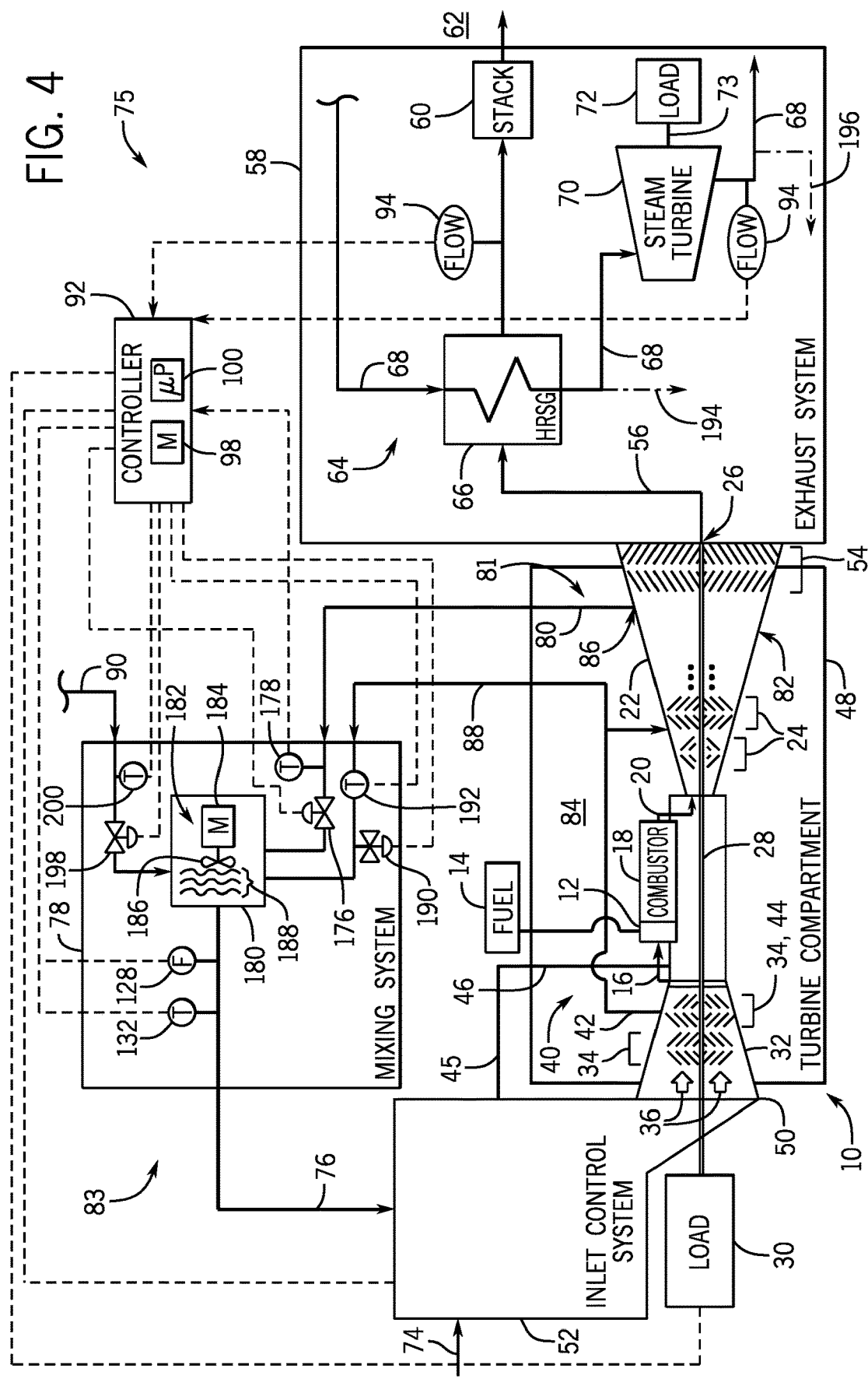
FIG. 4 is a schematic diagram of an embodiment of the gas turbine system and the mixing system of FIG. 1 with a mixing chamber.

As discussed above with FIGS. 2 and 3, the inlet control system 52 may supply the heated flow 76 to the inlet 50 of the compressor 32 through an IBH valve system 110 or a supplemental IH valve system 150. FIG. 4 illustrates an embodiment of the mixing system 78 that supplies the heated flow 76. As discussed above, the heated flow 76 supplied to the inlet control system 52 includes at least the TEG flow 80. The controller 92 may control the TEG flow 80 to the mixing system 78 via control of a TEG flow valve 176. The controller 92 may utilize temperature feedback from a TEG temperature sensor 178 to control the TEG flow valve 176. The TEG flow 80 may be mixed with one or more flows in a mixing chamber 180 to form the heated flow 76. In some embodiments, the mixing chamber 180 may have an active mixing element 182, including, but not limited to a motor 184 and fan 186, a pump, or other agitating structure that may be actively moved. Additionally, or in the alternative, the mixing chamber 180 may include one or more passive mixing elements 188, including, but not limited to baffles, screens, perforated plates, fins, or any combination thereof. Each of the active mixing elements 182 and the passive mixing elements 188 may facilitate mixing of the TEG flow 80 with one or more other flows in mixing chamber 180.

In some embodiments, an internal flow 88 is supplied to the mixing chamber 180. The internal flow 88 may include, but is not limited to the CEG flow 42, the bleed flow 46, a flow from the turbine compartment environment 84, or any combination thereof. As may be appreciated, the internal flow 88 may have a lower temperature than the TEG flow 80. Accordingly, the internal flow 88 may be mixed with the TEG flow 80 to moderate (e.g., decrease) the temperature of the heated flow 76. The controller 92 may be coupled to an internal flow valve 190 to control the composition and temperature of the heated flow 76 via control of the flow rate of the internal flow 88. The controller 92 may utilize temperature feedback from an internal flow temperature sensor 192 to control the internal flow valve 190.

In some embodiments, an external flow 90 is supplied to the mixing chamber 180. The external flow 90 may include, but is not limited to a water flow, a steam flow, a flow from the ambient environment 62, or any combination thereof. Where the external flow 90 is a water flow or a steam flow, the external flow 90 may be a portion 194 of the fluid flow 68 that exits the HRSG 66, a portion 196 of the fluid flow 68 that exits the steam turbine 70, or any combination thereof. As may be appreciated, the external flow 90 may have a lower temperature than the TEG flow 80. Additionally, the external flow 90 may have a greater humidity than the TEG flow 80. It may be appreciated that a given flow rate of the external flow with a relatively high humidity may have a greater effect on the temperature of the heated flow 76 than the same given flow rate of the external flow with a relatively low humidity. Accordingly, the external flow 90 may be mixed with the TEG flow 80 to moderate (e.g., decrease) the temperature of the heated flow 76. Thus, if the temperatures of the internal flow 88 and the external flow 90 are approximately the same, the controller 92 may decrease the temperature of the heated flow 76 more by mixing a given quantity of the external flow 90 (e.g., water flow, steam flow) with the TEG flow 80 than by mixing the given quantity of the internal flow 88. The controller 92 may be coupled to an external flow valve 198 to control the composition and temperature of the heated flow 76 via control of the flow rate of the external flow 90. The controller 92 may utilize temperature feedback from an external flow temperature sensor 200 to control the external flow valve 198.

It may be appreciated that the heated flow 76 supplied from the mixing system 78 includes at least the TEG flow 80, and the heated flow 76 may include the internal flow 88, the external flow 90, or any combination thereof. The controller 92 may utilize feedback from the first temperature sensor 132 to control the TEG flow valve 176, the internal flow valve 190, the external flow valve 198, the active mixing element 182, or any combination thereof. That is, the controller 92 may utilize feedback from the first temperature sensor 132 in a feedback loop to control the temperature of the heated flow 76. Additionally, or in the alternative, the controller 92 may utilize feedback from the first flow rate sensor 128 to control the TEG flow valve 176, the internal flow valve 190, the external flow valve 198, the active mixing element 182, or any combination thereof. That is, the controller 92 may utilize feedback from the first flow rate sensor 128 in a feedback loop to control the flow rate of the heated flow 76. Furthermore, it may be appreciated that each embodiment of the mixing system 78 described above with FIG. 4 may be configured to supply the heated flow 76 to either of the inlet control systems 52 described above and illustrated in FIGS. 2 and 3. That is, the mixing system 78 may be utilized to supply the heated flow 76 to the IBH valve system 110 or to the supplemental IH valve system 150 described above.

Numerous embodiments of the gas turbine system 10 are envisaged wherein the mixing system 78 includes one or more eductors. An eductor receives a motive fluid and a suction fluid. The motive fluid flow is supplied to the eductor at a higher pressure than the suction fluid flow. As the motive fluid travels through a tapered (e.g., decreasing cross-sectional area) passage, the pressure of the motive fluid decreases. This is referred to as the Venturi effect. As the pressure of the motive fluid decreases and the velocity increases, the suction fluid is drawn into the tapered passage of the eductor by suction (e.g., negative pressure). As the suction fluid is drawn into the eductor and travels through the tapered passage, the suction fluid mixes with the motive fluid and energy is exchanged between the two fluids. In some embodiments, the TEG flow 80 may be used as the suction fluid while the motive fluid may be one of the internal flow 88 or the external flow 90. As discussed above, the internal flow 88 may include, but is not limited to the CEG flow 42 from the compressor 32, the bleed flow 46 from the compressor 32, a turbine compartment air flow drawn from the turbine compartment environment 84, or any combination thereof. Additionally, the external flow 90 may include, but is not limited to a water flow, a steam flow, an air flow drawn from the ambient environment 62, or any combination thereof. In other embodiments, the TEG flow 80 may act as the motive fluid, while the suction fluid may be some other fluid (e.g., internal flow 88, external flow 90). In further embodiments, the mixing system 78 may include the eductor 202 and one or more additional mixing structures. For example, in some embodiments, the additional mixing structure may be the mixing chamber 180 shown and described with regard to FIG. 4. In other embodiments, the mixing structure may be a second eductor in which the output of the first eductor 202 is used as the suction fluid or the motive fluid for a second eductor. In the second eductor, the output from the first eductor may be mixed with a third fluid, such as the internal flow 88, the external flow 90, or any combination thereof. For example, the output from the first eductor may be mixed with process steam, ambient air, or turbine compartment air.

Figure 5:
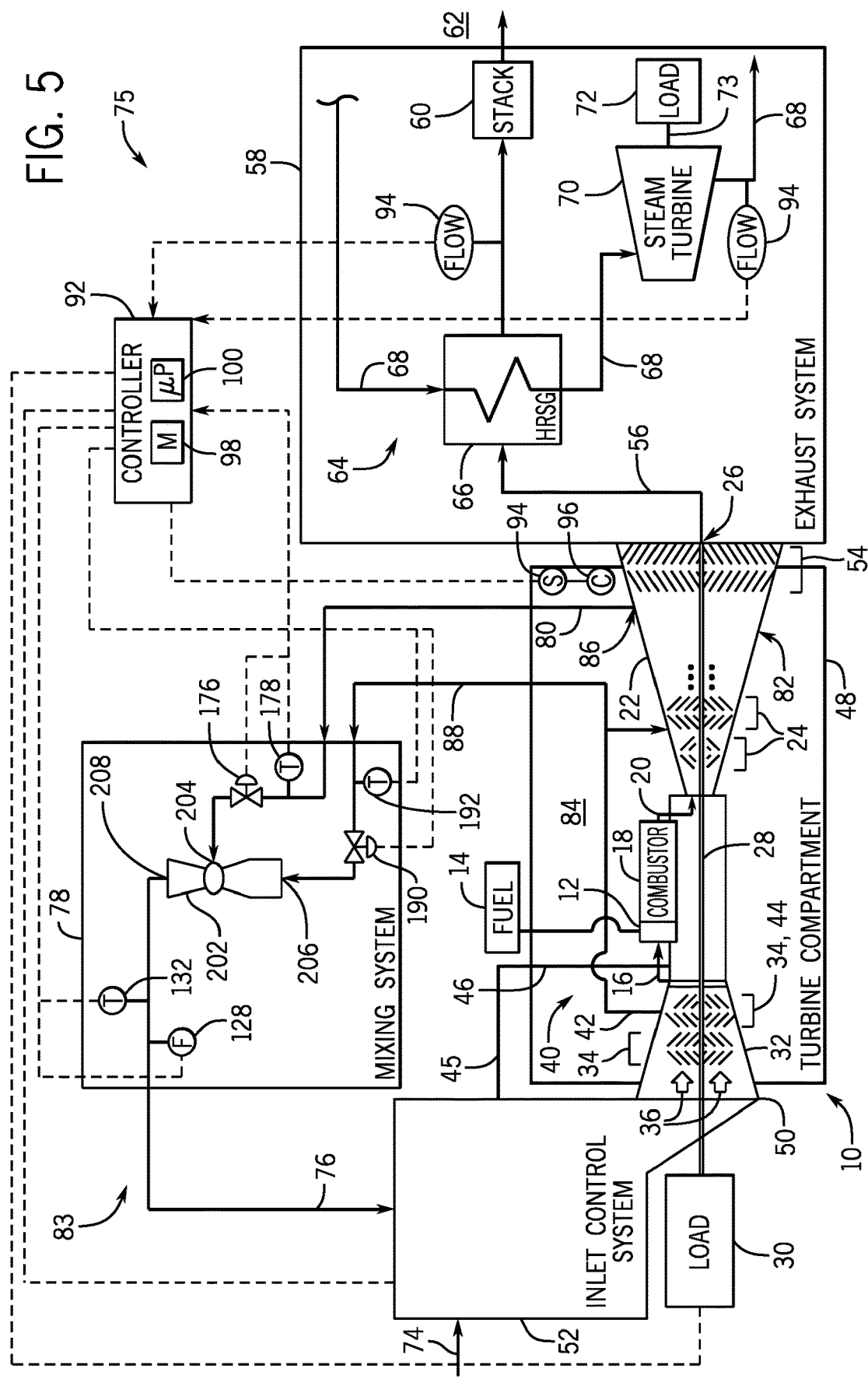
FIG. 5 is a schematic diagram of an embodiment of the gas turbine system and the mixing system of FIG. 1 with an eductor that mixes turbine extraction gas and a compressor extraction gas.

FIG. 5 illustrates an embodiment of the mixing system 78 having one eductor 202 that utilizes TEG flow 80 as the suction fluid and a pressurized flow 45 from the compressor 32 (e.g., CEG flow 42) as the motive fluid. As discussed above, the mixing system 78 supplies heated flow 76 to the inlet control system 52 that includes at least the TEG flow 80. The controller 92 may control the TEG flow 80 to the eductor 202 via control of the TEG flow valve 176. The controller 92 may utilize temperature feedback from the TEG temperature sensor 178 to control the TEG flow valve 176. The TEG flow 80 may then be supplied to the eductor 202 via a suction inlet 204. In other embodiments, which will be described in more detail below, the TEG flow 80 may be supplied to the eductor 202 as the motive fluid and another fluid (e.g., an airflow from the turbine compartment 48) may be used as the suction fluid. The internal flow 88 may be used as the motive fluid supplied to a motive inlet 206 of the eductor 202. In the illustrated embodiment, the internal flow 88 is the pressurized flow 45 (e.g., CEG flow 42) from the compressor 32. In some embodiments, the internal flow 88 supplied to the motive inlet 206 of the eductor 202 may include, but is not limited to the bleed flow 46, a flow from the turbine compartment environment 84, or a combination thereof. The controller 92 may control the internal flow 88 (e.g., CEG flow 42) to the eductor 202 via control of the internal flow valve 190. The controller 92 may utilize temperature feedback from the internal flow temperature sensor 192 to control the internal flow valve 190. The internal flow 88 (e.g., CEG flow 42) may then be supplied to the eductor 202 via a motive inlet 206. The motive inlet 206 is configured to receive a motive flow (e.g., CEG flow 42) with a motive pressure greater than a suction pressure of the TEG flow 80 at the suction inlet 204. As the pressure of the motive fluid (e.g., CEG flow 42) decreases, the suction fluid (e.g., TEG flow 80) may be drawn into the eductor 202 and mixed with the motive fluid in the eductor 202. The mixed motive fluid and suction fluid exit the eductor 202 via an outlet 208 as the heated flow 76. The outlet 208 may be configured to discharge the heated flow 76 to the inlet control system 52.

As may be appreciated, the internal flow 88 (e.g., CEG flow 42) may have a lower temperature than the TEG flow 80. Accordingly, the internal flow (e.g., CEG flow 42) may be mixed with the TEG flow 80 to moderate (e.g., decrease) the temperature of the heated flow 76. The controller 92 may modulate the TEG flow valve 176 and the internal flow valve 190 to control the composition and temperature of the heated flow 76. The controller 92 may utilize temperature feedback from one or more of the temperature sensors 178, 192 disposed upstream of the eductor 202, or the first temperature sensor 132 disposed downstream of the eductor 202. The heated flow 76 output from the mixing system 78 may be supplied to the inlet control system 52. As discussed in detail above, the inlet control system 52 may supply the heated flow 76 to the inlet 50 of the compressor 32 through the IBH manifold 114, the supplemental IH manifold 154, or both.

FIG. 6 illustrates an embodiment of the mixing system 78 having one eductor 202 that utilizes a turbine compartment airflow 210 as the suction fluid and TEG flow 80 as the motive fluid with a greater pressure than the turbine compartment airflow 210. In other embodiments, the suction fluid may be some other internal flow 88 (e.g., CEG flow 42) with a lower pressure than the TEG flow 80. The controller 92 may control the turbine compartment airflow 210 to the eductor 202 via control of the internal flow valve 190 (e.g., a turbine compartment airflow valve). The controller 92 may utilize temperature feedback from the internal flow temperature sensor 192 (e.g., a turbine compartment air temperature sensor) to control the internal flow valve 190. The turbine compartment airflow 210 may then be supplied or drawn to the eductor 202 via the suction inlet 204. As discussed above, the controller 92 may control the TEG flow 80 to the eductor 202 via control of the TEG flow valve 176. The controller 92 may utilize temperature feedback from the TEG temperature sensor 178 to control the TEG flow valve 176. The TEG flow 80 may then be supplied to the eductor 202 via the motive inlet 206. As the pressure of the motive fluid (e.g., TEG flow 80) decreases in the eductor 202, the suction fluid (e.g., turbine compartment airflow 210) may be drawn into the eductor 202 through the suction inlet 204 and mixed with the motive fluid (e.g., TEG flow 80) in the eductor 202 to form the heated flow 76.

As may be appreciated, the turbine compartment airflow 210 may have a lower temperature than the TEG flow 80. Accordingly, the turbine compartment airflow 210 may be mixed with the TEG flow 80 to moderate (e.g., decrease) the temperature of the heated flow 76. The controller 92 may modulate the TEG flow valve 176 and the internal flow valve 190 to control the composition and temperature of the heated flow 76. The controller 92 may utilize temperature feedback from one or more of the temperature sensors 178, 192 disposed upstream of the eductor 202, or the temperature sensor 132 disposed downstream of the eductor 202. The heated flow 76 output from the mixing system 78 may be supplied to the inlet control system 52. As discussed in detail above, the inlet control system 52 may supply the heated flow 76 to the inlet 50 of the compressor 32 through the IBH manifold 114, the supplemental IH manifold 154, or both.

FIG. 7 illustrates an embodiment of the mixing system 78 having one eductor 202 that utilizes TEG flow 80 as the suction fluid and one or more of the external flows 90 (e.g., a steam flow 216) as the motive fluid with a greater pressure than the TEG flow 80. The controller 92 may control the TEG flow 80 to the eductor 202 via control of the TEG flow valve 176. The controller 92 may utilize temperature feedback from the TEG temperature sensor 178 to control the TEG flow valve 176. The TEG flow 80 may then be supplied to the eductor 202 via the suction inlet 204. The steam flow 216 may be supplied by a steam source coupled to the motive inlet 206 of the eductor 202. The steam source may include, but is not limited to, the HRSG 66, the steam turbine 70, or any combination thereof. In some embodiments, the motive fluid may be some other external flow 90. For example, the motive fluid may include a water flow (e.g., fluid flow 68), a steam flow (e.g., fluid flow 68), or any combination thereof. The controller 92 may control the steam flow 216 to the eductor 202 via control of the external flow valve 198 (e.g., a steam valve). The controller 92 may utilize temperature feedback from the external flow temperature sensor 200 (e.g., a steam temperature sensor) to control the external flow valve 198. The steam flow 216 may be supplied to the eductor 202 via the motive inlet 206. As the pressure of the motive fluid (e.g., steam flow 216) decreases in the eductor 202, the suction fluid (e.g., TEG flow 80) may be drawn into the eductor 202 and mixed with the motive fluid in the eductor 202 to form the heated flow 76. The mixed motive fluid (e.g., steam flow 216) and suction fluid (e.g., TEG flow 80) exit the eductor 202 via the outlet 208 as the heated flow 76. The outlet 208 may be configured to discharge the heated flow 76 to the inlet control system 52.

As may be appreciated, the external flow 90 (e.g., steam flow 216) may have a lower temperature than the TEG flow 80. Accordingly, the external flow (e.g., steam flow 216) may be mixed with the TEG flow 80 to moderate (e.g., decrease) the temperature of the heated flow 76. The controller 92 may modulate the TEG flow valve 176 and the external flow valve 198 to control the composition and temperature of the heated flow 76. The controller 92 may utilize temperature feedback from one or more of the temperature sensors 178, 200 disposed upstream of the eductor 202, or the first temperature sensor 132 disposed downstream of the eductor 202. The heated flow 76 output from the mixing system 78 may be supplied to the inlet control system 52. As discussed in detail above, the inlet control system 52 may supply the heated flow 76 to the inlet 50 of the compressor 32 through the IBH manifold 114, the supplemental IH manifold 154, or both.

In some embodiments, a mixing structure may be coupled between the outlet 208 of the first eductor 202 and the inlet control system 52. The mixing structure may be configured to mix the heated flow 76 output from the eductor 202 with a third flow, which may include an ambient airflow, a turbine compartment airflow, or some other fluid. In some embodiments, the mixing structure may be a second eductor. FIG. 8 illustrates an embodiment of the mixing system 78 having the first eductor 202 and a second eductor 222. The first eductor 202 utilizes TEG flow 80 as the first suction fluid, and the internal flow 88 (e.g., CEG flow 42) as the first motive fluid supplied to the motive inlet 206. An output flow 230 of the first eductor 202 may be the suction fluid of the second eductor 222, and the external flow 90 (e.g., steam flow 216) may be the motive fluid of the second eductor 222.

As discussed above with FIGS. 5 and 6, the controller 92 may control the TEG flow 80 to the first eductor 202 via control of the TEG flow valve 176 and the controller 92 may control the internal flow 88 (e.g., CEG flow 42) to the first eductor 202 via control of the internal flow valve 190. The controller 92 may utilize temperature feedback from the TEG temperature sensor 178 to control the TEG flow valve 176. The TEG flow 80 may then be supplied to the first eductor 202 via the first suction inlet 204. The controller 92 may control the internal flow 88 (e.g., CEG flow 42) to the first eductor 202 via control of the internal flow valve 190. The controller 92 may utilize temperature feedback from the internal flow temperature sensor 192 to control the internal flow valve 190 and the supply of the internal flow 88 to the first eductor 202 via the motive inlet 206. The first eductor output flow 230 (e.g., the TEG flow 80 and the internal flow 88) may be supplied to the second eductor 222. In some embodiments, the first eductor output flow 230 is supplied to the second suction inlet 224 of the second eductor 222 as the second suction fluid.

The controller 92 may control the external flow 90 (e.g., steam flow 216) to the second motive inlet 226 of the second eductor 222 via control of the external flow valve 198. The controller 92 may utilize temperature feedback from the external flow temperature sensor 200 to control the external flow valve 198. The external flow 90 (e.g., steam flow 216) may be supplied to the second eductor 222 via the second motive inlet 226. The steam flow 216 may have a pressure that is greater than the output flow 230 from the first eductor 202. As the pressure of the second motive fluid (e.g., steam flow 216) decreases, the suction fluid (e.g., output flow 230) may be drawn into the second eductor 222 and mixed with the motive fluid in the second eductor 222 to form the heated flow 76.

The output flow 230 and the external flow 90 (e.g., steam flow 216) may be mixed to moderate (e.g., decrease) the temperature of the heated flow 76 supplied to the inlet control system 52. In some embodiments, one or more sensors 220 (e.g., a temperature sensor, a flow sensor, or both, may be disposed between the first eductor 202 and the second eductor 222. The one or more sensors 220 may be in communication with the controller 92 to provide information about output flow 230 (e.g., temperature, flow rate, pressure, etc.). The controller 92 may modulate the TEG flow valve 176, the internal flow valve 190, and the external flow valve 198 to control the composition and temperature of the heated flow 76 and/or the output flow 230. The controller 92 may utilize temperature feedback from one or more of the temperature sensors 178, 192, 200, disposed upstream of the eductor 202, a temperature sensor 132 disposed between the first eductor 202 and the second eductor 222, or a temperature sensor 132 disposed downstream of the first eductor 202 and the second eductor 222. The heated flow 76 output from the mixing system 78 may be supplied to the inlet control system 52. As discussed in detail above, the inlet control system 52 may supply the heated flow 76 to the inlet 50 of the compressor 32 through the IBH manifold 114, the supplemental IH manifold, or both.

Though FIGS. 5-8 illustrate various embodiments of the mixing system 78 having one or more eductors 202, 222, it should be appreciated that the illustrated embodiments are merely examples, and other configurations may be possible. For example, in one embodiment, the mixing system 78 may utilize CEG flow 42 as the motive fluid and TEG flow 80 as the suction fluid in the first eductor 202. The output flow 230 of the first eductor 202 may then be used as the motive fluid in the second eductor 222, with ambient air used as the suction fluid in the second eductor 222. In another embodiment, turbine compartment airflow 210 may be used as the suction fluid in the second eductor 222 with the output flow 230 containing the TEG flow 80 used as the motive fluid in the second eductor 222. In a similar manner, various internal flows 88 and external flows 90 may be used in various combinations with the TEG flow 80 as the motive and suction fluids in one or more eductors 202, 222, and mixed to form the heated flow 76. For example, the TEG flow 80 may act as the suction fluid or the motive fluid in either the first eductor 202 or the second eductor 222. Similarly, any of the internal flows 88 (e.g., the CEG flow 42, the bleed flow 46, the flow from the turbine compartment environment 84, or any combination thereof) may act as the suction fluid or the motive fluid for the first eductor 202 or the second eductor 222. Likewise, any of the external flows 90 (e.g., the water flow, the steam flow, the flow from the ambient environment 62, or any combination thereof) may be the suction fluid or the motive fluid for the first eductor 202 or the second eductor 222. The heated flow 76 output by the mixing system 78 may then be provided to the inlet control system 52.

It may be appreciated that the heated flow 76 supplied from the mixing system 78 includes at least the TEG flow 80. The heated flow 76 may also include the internal flow 88, the external flow 90, or any combination thereof. The controller 92 may utilize feedback from the first temperature sensor 132 to control the TEG flow valve 176, the internal flow valve 190, the external flow valve 198, or any combination thereof. That is, the controller 92 may utilize feedback from the first temperature sensor 132 in a feedback loop to control the temperature of the heated flow 76. Additionally, or in the alternative, the controller 92 may utilize feedback from the first flow rate sensor 128 to control the TEG flow valve 176, the internal flow valve 190, the external flow valve 198, or any combination thereof. That is, the controller 92 may utilize feedback from the first flow rate sensor 128 in a feedback loop to control the flow rate of the heated flow 76. Furthermore, it may be appreciated that each embodiment of the mixing system 78 described above with FIGS. 5-8 may be configured to supply the heated flow 76 to either of the inlet control systems 52 described above and illustrated in FIGS. 2 and 3. That is, the mixing system 78 may be utilized to supply the heated flow 76 to the IBH valve system 110 or to the supplemental IH valve system 150 described above.

Technical effects of the invention include controlling the quantity of the inlet flow supplied by the compressor to the combustor through controlling the temperature of the inlet flow with turbine extraction gas (TEG). The TEG may be added to an intake flow received from the ambient environment via an inlet bleed heat (IBH) valve system or a supplemental inlet heating (IH) valve system. The TEG may be mixed with one or more gas flows to moderate (e.g., decrease) the temperature of the heated flow added to the intake flow. The various mixing systems and mixing flows described above may facilitate temperature control of the inlet flow across a greater temperature range than an IBH valve system alone without the use of TEG. Additionally, extracting the TEG flow may reduce the output of the turbine, thereby increasing the turndown capability of the turbine relative to a turbine without an extracted TEG flow. Accordingly, the TEG flow extracted from the turbine may have a greater effect on the output of the turbine than heating the inlet flow alone.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
 a turbine extraction gas (TEG) heating system comprising:
  a turbine gas extraction system coupled to a turbine casing of a gas turbine system and to an inlet control system, wherein the inlet control system is configured to control a temperature of an intake flow through a compressor inlet of a compressor of the gas turbine system; and
  a first eductor comprising:
   a first motive inlet configured to receive an extraction portion of combustion products as a turbine extraction gas (TEG), wherein the TEG is received through the turbine casing;
   a first suction inlet configured to receive a suction flow with a suction pressure less than an extraction pressure of the TEG, wherein the suction flow comprises a turbine compartment air flow from a turbine compartment disposed about the compressor and a turbine of the gas turbine system, wherein the turbine compartment air flow is drawn from an environment within the turbine compartment outside of the compressor and the turbine; and
   an outlet configured to discharge a heated flow to the inlet control system, wherein the heated flow comprises the TEG and the suction flow, and the inlet control system is configured to supply the heated flow to the compressor inlet.

2. The system of claim 1, wherein the TEG heating system comprises:
 the inlet control system comprising an inlet bleed heat (IBH) valve system configured to receive a pressurized flow from the compressor; and
 a controller coupled to the inlet control system, wherein the controller is configured to control the IBH valve system to supply the pressurized flow to the compressor inlet.

3. The system of claim 2, wherein the inlet control system comprises a supplemental inlet heating (IH) valve system coupled to the controller and configured to receive the heated flow, wherein the controller is configured to control the supplemental IH valve system to supply the heated flow to the compressor inlet independent from control of the IBH valve system configured to supply the pressurized flow to the compressor inlet.

4. The system of claim 1, comprising:
   a first temperature sensor coupled to the compressor inlet, wherein the first temperature sensor is configured to sense the temperature of the intake flow through the compressor inlet; and
   a controller coupled to the first temperature sensor and to the TEG heating system, wherein the controller is configured to control the TEG heating system based at least in part on the temperature of the intake flow.

5. The system of claim 4, comprising a second temperature sensor coupled to the outlet and to the controller, wherein the second temperature sensor is configured to sense a second temperature of the discharged heated flow, and the controller is configured to control the TEG heating system based at least in part on the second temperature of the heated flow.

6. A system comprising:
   a controller comprising a memory and a processor, wherein the controller is configured to control a heated flow discharged from an outlet of an eductor to an inlet control system to control a temperature of an intake flow through a compressor inlet of a compressor of a gas turbine system,
   wherein the controller is configured to control a turbine extraction gas (TEG) flow to a motive inlet of the eductor, the controller is configured to control a suction flow to a suction inlet of the eductor, the TEG flow is extracted through a turbine casing, the suction flow is extracted through a turbine compartment disposed about the compressor and a turbine of the gas turbine system, wherein the suction flow comprises a turbine compartment air flow drawn from an environment within the turbine compartment outside of the compressor and the turbine, and the heated flow comprises the TEG flow and the suction flow.

7. The system of claim 6, wherein the controller is configured to control an inlet bleed heat (IBH) valve system of the inlet control system to supply a pressurized flow from the compressor to the compressor inlet.

8. The system of claim 7, wherein the controller is configured to control a supplemental inlet heating (IH) valve system coupled to the outlet of the eductor, wherein the controller is configured to control the supplemental IH valve system to supply the heated flow to the compressor inlet independent from control of the IBH valve system configured to supply the pressurized flow to the compressor inlet.

9. The system of claim 6, wherein the controller is configured to control the heated flow to the inlet control system based at least in part on a load on the turbine of the gas turbine system.

10. The system of claim 6, comprising a first temperature sensor coupled to the controller and to the compressor inlet, wherein the first temperature sensor is configured to sense the temperature of the intake flow through the compressor inlet, and the controller is configured to control the TEG flow and the suction flow to the eductor based at least in part on the temperature of the intake flow.

11. A method comprising:
   extracting a portion of combustion products through a turbine casing of a turbine as a turbine extraction gas (TEG);
   extracting a first suction flow from a turbine compartment disposed about a compressor of a gas turbine system and a turbine of the gas turbine system, wherein the first suction flow is drawn from an environment within the turbine compartment outside of the compressor and the turbine;
   mixing the TEG with the first suction flow within a first eductor to form a heated flow;
   supplying the heated flow to an inlet control system coupled to a compressor inlet of the compressor; and
   controlling the heated flow to the compressor inlet to control a temperature of an intake flow through the compressor inlet.

* * * * *